United States Patent [19]
Britsch et al.

[11] Patent Number: 5,205,678
[45] Date of Patent: Apr. 27, 1993

[54] GEAR CUTTING TOOL

[75] Inventors: Heinz G. Britsch, New Berlin; Harvey H. Cords, South Milwaukee; Larry S. Gallett, Oak Creek; John G. Lawton, Milwaukee, all of Wis.

[73] Assignee: Bucyrus-Erie Company, South Milwaukee, Wis.

[21] Appl. No.: 936,168

[22] Filed: Aug. 27, 1992

[51] Int. Cl.⁵ ............................ B23P 15/28; B26D 1/06
[52] U.S. Cl. .............................................. 407/6; 407/20; 407/69; 407/70; 407/104; 407/106
[58] Field of Search ................. 407/2, 6, 20, 66, 67, 407/69, 70, 101, 102, 103, 104, 106; 409/47

[56] References Cited

U.S. PATENT DOCUMENTS

| | | | |
|---|---|---|---|
| 707,472 | 8/1902 | Armstrong | 407/69 |
| 1,307,633 | 6/1919 | Midgley et al. | 407/67 |
| 1,392,361 | 10/1921 | Sears | 407/28 |
| 1,480,610 | 1/1924 | Harten | 407/20 |
| 1,677,815 | 7/1928 | Croft | 407/20 |
| 1,903,988 | 4/1933 | Fickett | 407/28 |
| 1,925,528 | 9/1933 | Fickett | 407/28 |
| 1,926,646 | 9/1933 | Leahy | 407/28 |
| 2,456,842 | 12/1948 | Rutbell | 407/20 |
| 2,628,538 | 2/1953 | Miller | 409/47 |
| 2,930,112 | 3/1960 | Thomas | 407/22 |
| 3,371,567 | 3/1968 | Davis | 407/69 |
| 3,688,365 | 9/1972 | Gubelmann | 407/20 |
| 3,688,368 | 9/1972 | Bodem | 407/25 |
| 4,426,893 | 1/1984 | Miller | 76/1 |
| 4,557,220 | 12/1985 | Fischer | 407/20 |
| 4,720,220 | 1/1988 | Bloch et al. | 409/33 |
| 4,938,110 | 7/1990 | Ruby | 82/106 |
| 5,004,378 | 4/1991 | Arai et al. | 407/101 |
| 5,029,500 | 7/1991 | Ruby | 82/106 |
| 5,031,491 | 7/1991 | Hofmann | 407/106 |

FOREIGN PATENT DOCUMENTS

| | | | |
|---|---|---|---|
| 522734 | 4/1955 | Italy | 407/70 |
| 288500 | 1/1971 | U.S.S.R. | 407/70 |
| 990443 | 1/1983 | U.S.S.R. | 407/20 |

*Primary Examiner*—Bruce M. Kisliuk
*Assistant Examiner*—Bryan Reichenbach

[57] ABSTRACT

A gear cutting tool has a series of separate cutter inserts removeably clamped to the front ledge of a holder block. Each cutter insert has a forward cutting edge that extends beyond the ledge and a rear positioning portion that includes a central projection extending rearwardly from side faces. The central projection mates with a respective one of a series of parallel tracks formed in the holder block and the rear faces mate with upright front walls at the rear of the ledge on either side of the track. The arrangement precisely locates the cutter insert in the holder block. The holder block may be formed of a single piece or may be built up of identical interlocking block elements.

15 Claims, 2 Drawing Sheets

U.S. Patent
Apr. 27, 1993
5,205,678
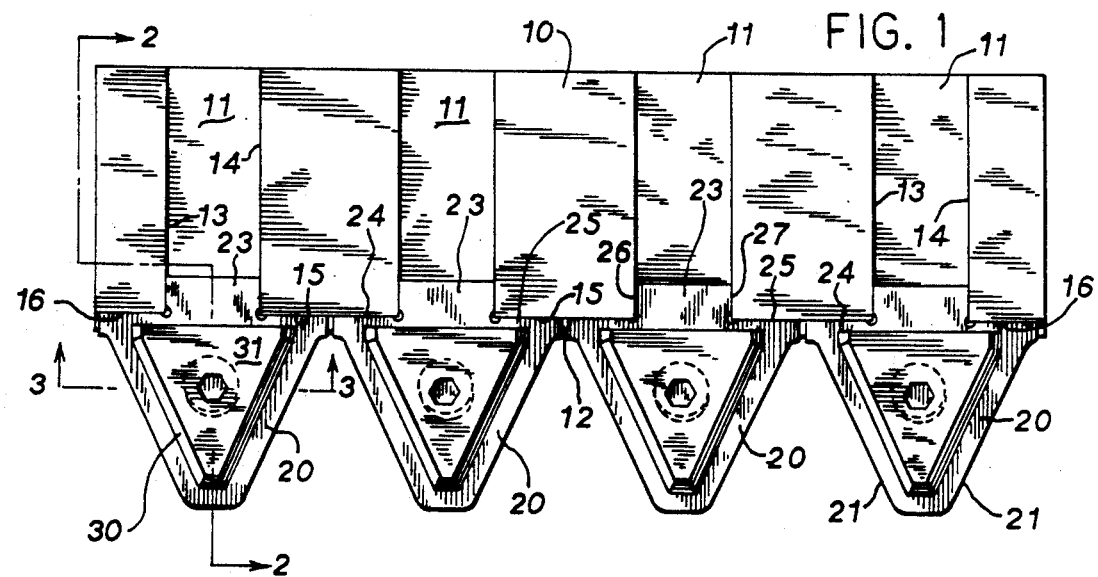
FIG. 1
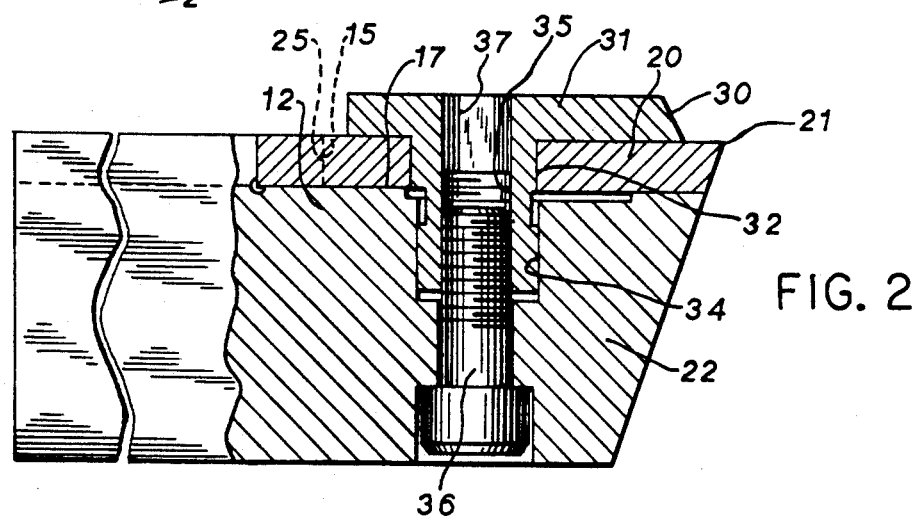
FIG. 2
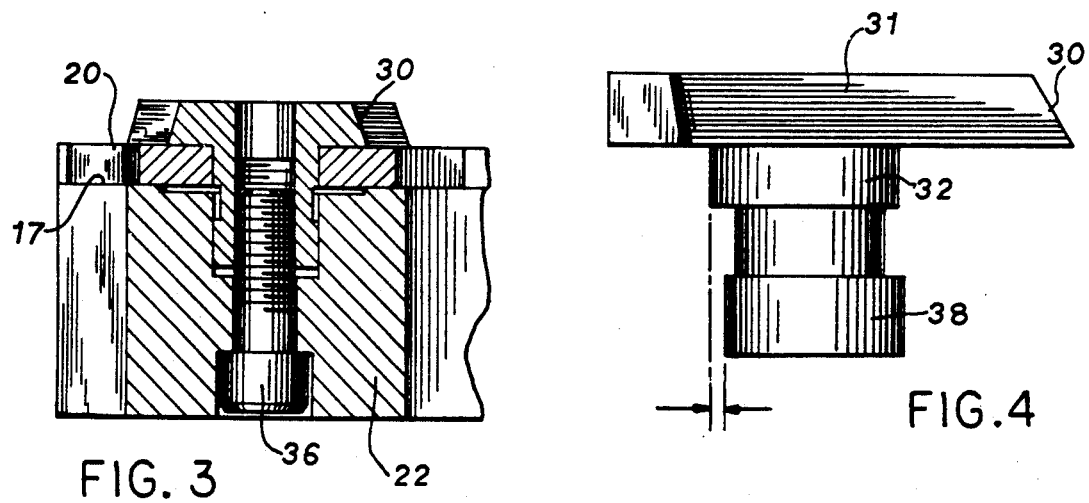
FIG. 3
FIG. 4

5,205,678

GEAR CUTTING TOOL

BACKGROUND OF THE INVENTION

This invention relates to cutting tools, and particularly to a gear cutting rack having replaceable cutter inserts.

A common form of tool for generating involute gear teeth is a rack of spaced cutter teeth arranged side-by-side and which are brought to bear against the perimeter of a gear blank. The rack reciprocates across the face of the perimeter while the blank is indexed. The rack typically has several projecting cutter teeth that are triangular shaped and have cutting edges along the converging sides of each tooth.

A typical machine tool that uses rack type gear cutters is the Maag generating machine. When a multi-toothed cutter is used in such a machine, one of the interior teeth is subjected to the greatest loads as it generates the profile of the gear teeth that are normal to the tool. Teeth on either side of the interior cutter tooth are subjected to lower loads because they are generating only a portion of the profile on the teeth preceding and succeeding the gear teeth normal to the cutter. As a result, it is common to have uneven wear on the cutter teeth.

Heretofore, the rack gear cutters have been formed from a single block of metal. That is, the cutter teeth are machined into a single block of tool steel. These tool tacks are very expensive to manufacture. Since the cutter teeth are subjected to considerable wear, they must be resharpened and that has the effect of altering the size of the racks including the space between the cutter teeth. Unless alternative backups for each sized cutting tooth are provided, the machine tool is down while the cutter teeth are resharpened. If one of the cutter teeth should break, such as an intermediate tooth subjected to the greatest force during machining, the entire rack must be discarded and replaced.

SUMMARY OF THE INVENTION

It is a principal object of the invention to eliminate the costly one piece cutting tool racks that have been heretofore used for generating gear teeth.

It is a further object of the invention to eliminate the need for resharpening individual cutter teeth.

These objects are achieved by providing individual, replaceable cutter inserts which are removably mounted and aligned in a common block, or which are mounted in individual block elements that are joined together to form a common block.

More specifically, the invention involves a gear cutting tool that includes a tool holder block having a forward ledge and a plurality of spaced parallel tracks extending rearwardly from the ledge. A removeable cutter insert is disposed in each individual track. Each insert has a forward cutting edge that extends beyond the ledge and a rear locating portion that extends into the track and is aligned against side walls of the track and against upright front walls of the ledge. A clamp removably clamps each insert onto the tool blocl.

The tool holder block may be one piece with the parallel tracks and ledge formed in the single unit. Alternately, the holder block may be built up from a plurality of block elements each having a forward ledge and a track extending rearwardly from the ledge. Preferably, the block elements have mating projections and recesses on their sides that align the block elements together with the tracks parallel to each other. A bolt extending through aligned transverse bores in each of the block elements joins the elements together.

Preferably, the clamp includes a clamp member that overlays a cutting insert and has a boss that extends downwardly through an opening in the insert. The boss is threadably engaged by a bolt extending upwardly through the ledge portion.

The sets of inserts attached to the holder block would be identical. However, the holder block can accept different sets of cutter inserts to machine different gear tooth sizes and spacings. The block elements that are joined together are identical. As a result, a holder block can be made up of any number of block elements and cutter inserts to provide a cutter tool of one, two, three or more teeth.

The foregoing and other objects and advantages of the invention will appear in the following detailed description of the invention. In the description which follows, reference is made to the accompanying drawings which illustrate preferred embodiments of the invention.

BRIEF DESCRIPTION OF THE DRAWINGS

FIG. 1 is a top plan view of a first embodiment of a cutting tool in accordance with this invention;

FIG. 2 is an enlarged side view, partially in section, and taken in the plane of the line 2—2 of FIG. 1;

FIG. 3 is a view in vertical section taken in the plane of the line 3—3 of FIG. 1;

FIG. 4 is an enlarged side view of a clamp member used in the first embodiment;

DETAILED DESCRIPTION OF THE PREFERRED EMBODIMENTS

Figure 5:
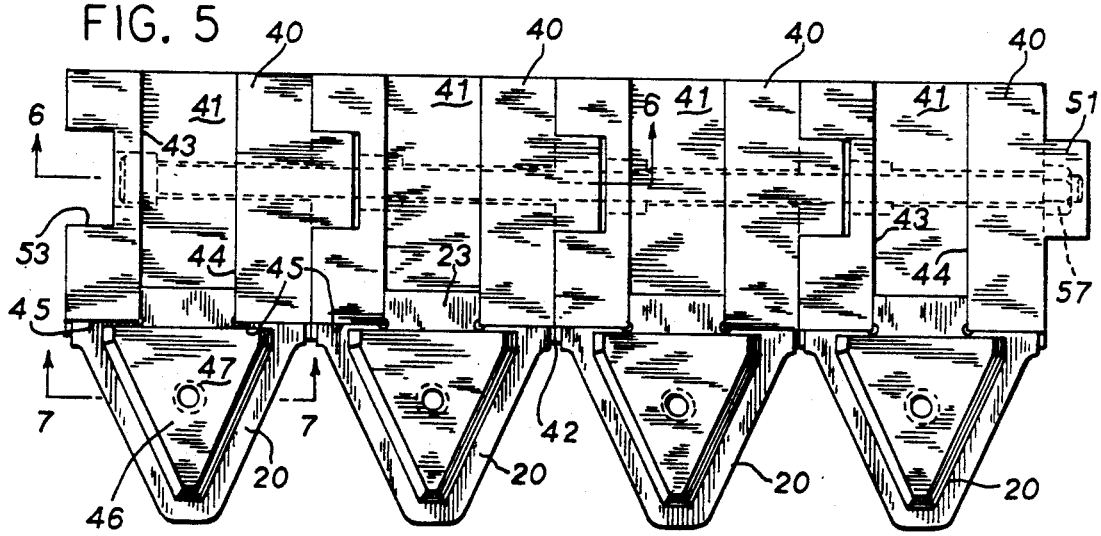
FIG. 5 is a top plan view of a second embodiment of the cutting tool holder in which the holder block is made up of separate block elements.
Figures 6, 7:
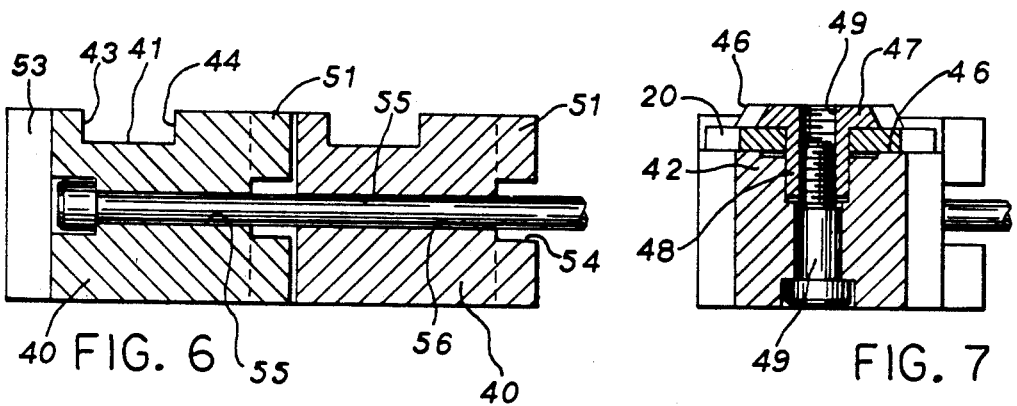
FIG. 6 is a view in vertical section taken in the plane of the line 6—6 of FIG. 5.
FIG. 7 is a view in vertical section taken in the plane of the line 7—7 of FIG. 5.

The first embodiment illustrated in FIGS. 1-4 has a unitary holder block 10 that is machined to provide a plurality of spaced parallel tracks 11 that extend rearwardly from a front ledge 12. The tracks 11 are each defined by spaced and parallel upright side walls 13 and 14 which are also parallel to the like side walls 13 and 14 of the other tracks 11. The rear of the ledge 12 is defined by upright front walls 15 extending between adjacent tracks 11 and by front walls 16 on the two ends of the block 10. The front walls 15 and 16 are normal to the top surface 17 of the ledge 12 and are disposed in a single plane. The front walls 15 and 16 are perpendicular to the side walls 13 and 14 of the tracks 11. The bottom surface of the tracks 11 is a continuation of the top surface 17 of the ledge 12 and the side walls 13 and 14 are perpendicular to that surface.

A plurality of cutter inserts 20 are of generally triangular shape and have a cutting edge 21 that extends along two converging sides of the insert 20. The ledge 12 is provided with forwardly projecting teeth 22 at each track location and the insert is disposed upon the ledge tooth 22 with the cutting edge 21 extending beyond the ledge. Each insert 20 has a rear locating portion that includes a central projection 23 that extends rearwardly from rear faces 24 and 25 of the insert 20 that are on opposite sides of the central projection 23. The rear faces 24 and 25 are upright and bear against the front walls 15 and 16 while the central projection 23 has parallel side faces 26 and 27 that mate with the side walls 13 and 14 of the track 11.

All of the cutter inserts 20 are identical. By careful attention to the orthogonal relationship of the side walls 13 and 14, front walls 15 and 16 and the top surface 17 of the ledge 12, and by a similar close attention to the orthogonal relationship of the side faces 26 and 27 with the rear faces 24 and 25 and the bottom surface of the cutters 20, the cutter inserts 20 can be precisely located on the holder 10 and aligned at carefully controlled center-to-center spacings and along the common plane defined by the rear walls 15 and 16.

The cutter inserts 20 are each held in place by a clamp formed from a clamp member 30 having a generally triangular shaped head 31. A boss 32 extends downwardly from the head, through an opening 33 in the center of the cutter insert 20, and into a counter bore 34 in the ledge 12. The boss 32 has a threaded bore 35 that receives a bolt 36 extending upwardly through each tooth projection 22 of the ledge 12. The upper end 37 of the bore 35 is formed to accept a hexagonal key. A bottom portion 38 of the boss 32 is received in the counter bore 34. The bottom portion 38 is eccentric of the remainder of the boss and is eccentric of the centerline of the threaded bore 35 so that tightening of the bolt 36 will wedge the boss in place and prevent movement of the clamp when the cutter insert is subjected to vibrations during machining. The head 31 of the clamp member 30 has sloping faces on its leading edges so that it can function as a chip breaker.

In the second embodiment of FIGS. 5 through 8, the holder block is built up from a plurality of identical block elements 40. Each block element has a track 41 extending rearwardly from a ledge 42 and with parallel spaced side walls 43 and 44. The ledge 42 has front walls 45 on each side of the track that are perpendicular to the sidewalls 43 and 44 and perpendicular to the top surface 46 of the ledge 42. Each block element is adapted to receive a cutter insert 20 which has its central projection 23 mating with the track 41 and with its rear faces abutting the front walls 45 on either side of a track 41. The inserts are held in place by a clamp that includes a clamp member 46 having a triangular head portion 47 and a depending boss 48. The boss is threaded throughout the length of a through bore 49 and receives a bolt 49. The boss of the second embodiment is not eccentric.

Figure 8:
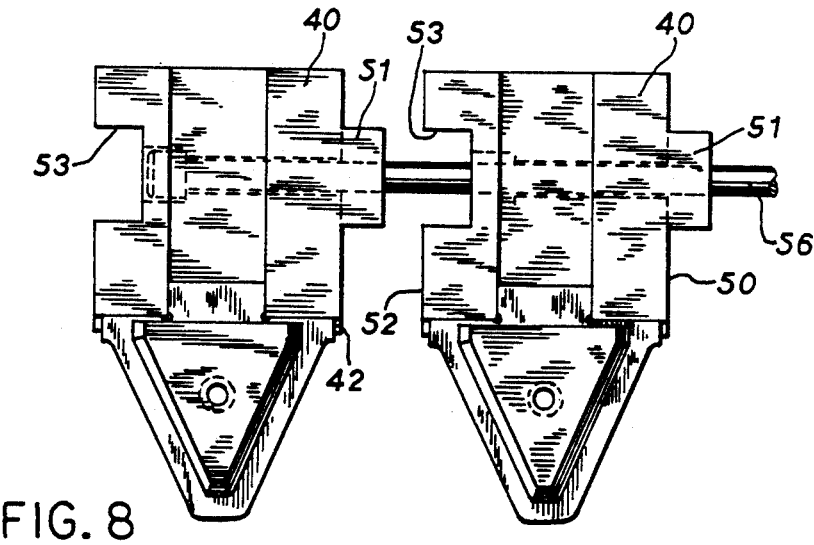
FIG. 8 is a top plan view illustrating the method of joining the block elements.

A holder block is formed by joining together a plurality of the block elements 40. To that end, each block element 40 has a first side wall 50 with an orthogonal projection 51 and an opposite side wall 52 with an orthogonal recess 53. As shown in FIGS. 5 and 8, the projection 51 on one block element 40 is adapted to seat within and mate with the recess 53 of an adjacent block element. The orthogonal projection 51 is provided with a central opening 54, and a through bore 55 extends transversely through the block element 40 and through the opening 54. A headed through bolt 56 extends through the aligned bores 55 of adjacent block elements 40 and the threaded end of the bolt 56 receives a nut 57 that is nestled in the opening 54 in the endmost block element 40.

The tool holder block 10 and the block elements 40 of the two embodiments are reusable. They can be formed from steel that has been carborized and hardened. They do not need to made of tool steel. The cutter inserts 20, on the other hand, can be formed of highly durable specialty tool steels or other cutting tool material. The tool holders can be used for regular inserts and special inserts, thereby reducing the tool inventory to a stock of inserts rather than requiring a large inventory of tool holders with integral cutting teeth. The inserts are interchangeable from one position to any other position on the block. This assists in assuring even tool wear. That is, the inserts that are subjected to the greatest wear can be periodically exchanged for the inserts that are subjected to the lesser wear. A broken or dull insert can be easily and quickly replaced without the need to shut down the machine tool while a replacement tool holder is sharpened.

I claim:

1. A gear cutting tool comprising:
   a tool holder block having a forward ledge and a plurality of spaced parallel tracks extending rearwardly from the ledge, the tracks being defined by parallel upright side walls and the side walls of adjacent tracks being joined by an upright front wall that is perpendicular to the side walls and rises from the ledge;
   a removable cutter insert for each track, each insert having a forward cutting edge that extends beyond the ledge and a rear locating portion;
   said rear locating portion including upright rear faces disposed against the front walls on either side of a track and a central projection extending rearwardly of the rear faces and having parallel side faces that mate with the side walls of the track; and
   a clamp for removably clamping each insert onto the holder block.

2. A cutting tool in accordance with claim 1 wherein the cutting inserts each have a cutting edge adapted to generate an involute tooth profile.

3. A cutting tool in accordance with claim 2 wherein the cutting inserts are generally triangular in shape and the ledge of the holder block includes a series of forward triangular projections with one projection beneath each insert.

4. A cutting tool in accordance with claim 1 wherein each insert has a central opening and the clamp comprises a clamp member having a top adapted to overlie the insert with a boss extending downwardly into the central opening, together with a bolt extending upwardly through the holder block and threaded into the boss.

5. A cutting tool in accordance with claim 4 wherein the boss includes a portion that is eccentric to a centerline of the central opening and to a longitudinal axis of the bolt so that tightening of the bolt locks the clamp member.

6. A cutting tool in accordance with claim 1 wherein the holder block is a single integral member.

7. A cutting tool in accordance with claim 1 wherein the holder block is formed from a plurality of block elements disposed side by side with each element having a ledge, a track, and front walls on each side of the track, together with a fastener that joins the elements together.

8. A cutting tool in accordance with claim 7 wherein the block elements each include mating projections and recesses to align the block elements with the tracks parallel to each other and with the front walls of all of the elements in a common plane.

9. A gear cutting tool comprising:
- a plurality of tool holder block elements each having a forward ledge and a track extending rearwardly from the ledge, the track being defined by parallel upright side walls, the rear of the ledge being defined by upright front walls on either side of the track that are perpendicular to the track side walls and rise from the ledge, the block elements being joined together in side by side relation with the tracks being parallel to each other and the front walls aligned in a single upright plane;
- a removeable cutter insert for each track, each insert having a forward cutting edge that extends beyond the ledge and a rear locating portion;
- said rear locating portion including upright rear faces disposed against the front walls on either side of a track and a central projection extending rearwardly of the rear faces and having parallel side faces that mate with the side walls of the track; and
- a clamp for removably clamping each insert onto the holder block element.

10. A cutting tool in accordance with claim 9 wherein the block elements are identical.

11. A cutting tool in accordance with claim 9 wherein the cutting inserts each have a cutting edge adapted to generate an involute tooth profile.

12. A cutting tool in accordance with claim 11 wherein the cutting inserts are generally triangular in shape and the ledge of each holder block element includes a forward triangular projection beneath each insert.

13. A cutting tool in accordance with claim 11 wherein each insert has a central opening and the clamp comprises a clamp member having a top adapted to overlie the insert with a boss extending downwardly into the central opening, together with a bolt extending upwardly through the holder block element and threaded into the boss.

14. A cutting tool in accordance with claim 10 wherein each block element has a pair of parallel upright sides that are parallel to the track side walls, one upright side of each block element having an orthogonal projection and the other upright side having an orthogonal recess that receives the projection of the adjacent block element.

15. A cutting tool in accordance with claim 14 wherein the block elements each having a bore extending from one upright side to the other upright side, together with a bolt extending through the bores to fasten the block elements together.

* * * * *